United States Patent
Rakshit

(10) Patent No.: US 10,038,943 B2
(45) Date of Patent: Jul. 31, 2018

(54) COMMON PURCHASE PLAN BASED ADVERTISEMENT

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/510,835

(22) Filed: Oct. 9, 2014

(65) Prior Publication Data
US 2015/0026720 A1 Jan. 22, 2015

Related U.S. Application Data

(63) Continuation of application No. 12/884,779, filed on Sep. 17, 2010, now Pat. No. 8,904,428.

(51) Int. Cl.
*H04N 7/10* (2006.01)
*H04N 7/025* (2006.01)
(Continued)

(52) U.S. Cl.
CPC ....... *H04N 21/812* (2013.01); *G06Q 30/0251* (2013.01); *G06Q 30/0255* (2013.01);
(Continued)

(58) Field of Classification Search
CPC ............. H04N 21/812; H04N 21/4126; H04N 21/4755; H04N 21/41415;
(Continued)

(56) References Cited

U.S. PATENT DOCUMENTS

| | | | |
|---|---|---|---|
| 4,513,983 A | 4/1985 | Calder | |
| 4,894,789 A | 1/1990 | Yee | |

(Continued)

OTHER PUBLICATIONS

"T V TeleShopping—Healthcare & Fitness Equipment and Health Care Products manufact . . . ", http://www.indiamart.com/company/1466763/, accessed: May 5, 2010.
(Continued)

*Primary Examiner* — Yassin Alata
(74) *Attorney, Agent, or Firm* — Scully, Scott, Murphy & Presser, P.C.; Scott Dobson, Esq.

(57) ABSTRACT

A method, system, and computer program product are disclosed for selecting an advertisement for play on a specified device for one or more users. Each of the users has a defined relationship with the specified device, and has an information description stored on a mobile communications device. In one embodiment, the method comprises transmitting the respective information description of each of one or more users from the user's communications device to a provider server. The server analyzes one or more information descriptions to identify an advertisement for playing on the specified device. The specified device, in one embodiment, is a television. In an embodiment, advertisements are displayed based on common purchase profiles and common purchase plans among different people. The purchase plans may be sent to the television when the users are in a defined area or come within a given distance of the television.

20 Claims, 8 Drawing Sheets

(51) Int. Cl.
| | |
|---|---|
| *H04N 21/81* | (2011.01) |
| *G06Q 30/02* | (2012.01) |
| *H04N 21/2668* | (2011.01) |
| *H04N 21/25* | (2011.01) |
| *H04N 21/41* | (2011.01) |
| *H04N 21/414* | (2011.01) |
| *H04N 21/4363* | (2011.01) |
| *H04N 21/442* | (2011.01) |
| *H04N 21/475* | (2011.01) |
| *H04N 21/658* | (2011.01) |
| *H04N 21/258* | (2011.01) |

(52) U.S. Cl.
CPC ....... *G06Q 30/0267* (2013.01); *H04N 21/252* (2013.01); *H04N 21/2668* (2013.01); *H04N 21/4126* (2013.01); *H04N 21/41407* (2013.01); *H04N 21/41415* (2013.01); *H04N 21/43637* (2013.01); *H04N 21/44222* (2013.01); *H04N 21/4755* (2013.01); *H04N 21/6582* (2013.01); *H04N 21/25841* (2013.01)

(58) Field of Classification Search
CPC ......... H04N 21/43637; H04N 21/2668; H04N 21/25841; H04N 21/6582; H04N 21/44222; H04N 21/252
USPC ................ 725/32–36, 42, 46; 705/14.4, 14.9
See application file for complete search history.

(56) References Cited

U.S. PATENT DOCUMENTS

| | | | |
|---|---|---|---|
| 2007/0214470 A1* | 9/2007 | Glasgow et al. ................ 725/10 |
| 2008/0109843 A1* | 5/2008 | Ullah ............................... 725/34 |
| 2008/0162721 A1* | 7/2008 | Miyake ......................... 709/238 |
| 2008/0255935 A1* | 10/2008 | Madhavan et al. ............. 705/14 |
| 2008/0313030 A1 | 12/2008 | Makeev et al. |
| 2009/0217319 A1 | 8/2009 | Weiss |
| 2009/0254447 A1* | 10/2009 | Blades ................. G06Q 10/083 |
| | | | 705/26.1 |
| 2009/0260030 A1* | 10/2009 | Karlsson et al. ............... 725/32 |
| 2010/0037255 A1 | 2/2010 | Sheehan et al. |
| 2010/0161424 A1 | 6/2010 | Sylvain |
| 2010/0175078 A1 | 7/2010 | Knudson et al. |

OTHER PUBLICATIONS

Chorianopoulos, K., et al., "A Metaphor for Personalized Television Programming", Lecture Notes in Computer Science, 2003, pp. 187-194, vol. 2615/2003, Springer Berlin/Heidelberg, Abstract only.

* cited by examiner

| PURCHASE PLAN OF USER A | | | | |
|---|---|---|---|---|
| FREQUENCY OF PURCHASE | MONTHLY | | | |
| POSSIBLE DATE OF PURCHASE | PRODUCT TYPE | PRODUCT NAME | QUANTITY | COMMENT |
| 1 DAY OF THE MONTH | GROCERY ITEMS | PROD 1 | 2 | |
| | | PROD 2 | 2 | |
| | | PROD 3 | 2 | |
| | | PROD 4 | 2 | |
| | | PROD 5 | 2 | |
| EVERY SUNDAY | ANIMAL PRODUCTS | PROD 11 | 2 | |
| | | PROD 12 | 2 | |
| | | PROD 13 | 2 | |
| | | PROD 14 | 2 | |
| | | PROD 15 | 2 | |
| FREQUENCY OF PURCHASE | WEEKLY | | | |
| POSSIBLE DATE OF PURCHASE | PRODUCT TYPE | PRODUCT NAME | QUANTITY | COMMENT |
| EVERY SUNDAY | VEGETABLE ITEM | PROD 10 | 2 | |
| | | PROD 6 | 2 | |
| | | PROD 7 | 2 | |
| | | PROD 8 | 2 | |
| | | PROD 9 | 2 | |
| FREQUENCY OF PURCHASE | YEARLY | | | |
| POSSIBLE DATE OF PURCHASE | PRODUCT TYPE | PRODUCT NAME | QUANTITY | COMMENT |
| 1 APR OF EVERY YEAR | GIFT ITEM | PROD 17 | 1 | GIFT FOR SPOUSE |
| 1 JAN OF EVERY YEAR | GIFT ITEM | PROD 16 | 1 | GIFT FOR 5 YEARS KID |

| PURCHASE PLAN OF USER B | | | | |
|---|---|---|---|---|
| FREQUENCY OF PURCHASE | MONTHLY | | | |
| POSSIBLE DATE OF PURCHASE | PRODUCT TYPE | PRODUCT NAME | QUANTITY | COMMENT |
| 15 DAY OF THE MONTH | GROCERY ITEMS | PROD 1 | 2 | |
| | | PROD 2 | 2 | |
| | | PROD 3 | 2 | |
| | | PROD 22 | 2 | |
| | | PROD 5 | 2 | |
| EVERY SUNDAY | ANIMAL PRODUCTS | PROD 11 | 2 | |
| | | PROD 12 | 2 | |
| | | PROD 13 | 2 | |

| PURCHASE PLAN OF USER C | | | | |
|---|---|---|---|---|
| FREQUENCY OF PURCHASE | MONTHLY | | | |
| POSSIBLE DATE OF PURCHASE | PRODUCT TYPE | PRODUCT NAME | QUANTITY | COMMENT |
| 1 DAY OF THE MONTH | GROCERY ITEMS | PROD 1 | 2 | |
| | | PROD 2 | 2 | |
| | | PROD 3 | 2 | |
| | | PROD 4 | 2 | |
| | | PROD 66 | 2 | |

COMMON PURCHASE PLAN BASED ADVERTISEMENT

CROSS REFERENCE TO RELATED APPLICATION

This application is a continuation of co-pending patent application Ser. No. 12/884,779, filed Sep. 17, 2010, the disclosure of which is hereby incorporated herein by reference in its entirety.

BACKGROUND

This invention generally relates to personalized or targeted advertisements. More specifically, the invention relates to distributing such advertisements to a specific electronic media device, such as a television, based on user information sent to that media device by one or more users who are watching or listening to that specific media device.

Advertising has become extremely common. Businesses advertise goods and services to consumers using print ads in newspapers and magazines, direct mail, telemarketing, television commercials, radio commercials, sponsorships, promotional offers, paid search results, banner adds on the Internet, and in many other ways.

A television advertisement or commercial, for example, is a form of advertising in which goods, services, organizations, ideas, etc. are promoted via the medium of television. Most commercials are produced by an outside advertising agency, and airtime is purchased from a television channel or network. Usually, television advertisements consist of advertising spots, ranging in length from a few seconds to several minutes, appearing between shows or show segments. This advertising method has been used over the years to sell different products, from household products to goods and services to political campaigns. This method of screening advertisements is intended to capture the attention of the audience, keeping the viewers focused on the television show so that they may watch the advertisements while waiting for the next segment of the show. Despite the general success of advertising, many specific advertisements are shown to uninterested viewers who are not currently interested in the advertised goods or services.

Given the importance and expense of advertising and the increasing difficulty in reaching the desired audience, extensive efforts have been made to provide advertising that is targeted to specific individuals and deliverable to these individuals in a more effective manner. Such personalized advertising generally involves obtaining information about a user's behavior or the media content that is viewed by the user and identifying advertisements to present to the user based on the information.

Certain targeted advertising schemes are being developed where the user provides personal information that identifies preferences for advertisements of a particular type, style, with particular content, and the like. As the specificity of the personal information increases, the effectiveness of selecting advertisements of interest for the user increases. For example, a user may provide personal information that indicates they are interested in cooking, travel, and automobiles, and based on the personal information, cooking, travel, and automobile related advertising is selected for delivery and presentation to the user.

Personalized advertising systems generally maintain a profile for a given user or household associated with a user. The profile is used to store the general or specific profile information that is obtained from the user or about the user from any number of sources. The profile information is then used to select advertisements to present to the user.

While the use of profiles has proven helpful, targeted advertisements have not heretofore specifically taken into account the fact that many televisions are viewed by different groups of people at different times. Televisions are installed in many places, such as offices, hotels, restaurants, train stations, airports, etc., where many different people watch the televisions at different times. For example, one group of people may be in a restaurant for lunch and watch a particular television. A completely different group of people may be in the same restaurant for dinner and watch the same television. Some of the advertisements shown on the television may be of interest to some of the people in each group but not to others. In fact, in both groups some of the people may be bored or irritated by the advertisements.

There are many cases where personalized television advertisements can be configured; and in these cases, the television advertisements can be displayed based on the configuration. This is more of a static type of profile. These types of personalized television advertisements may not be useful in many places, such as offices, hotels, restaurants, and other places, where the television viewers change rapidly. The advertisements shown in these places may create frustration among the viewers, and the advertiser does not benefit from the advertisement.

BRIEF SUMMARY

Embodiments of the invention provide a method, system, and computer program product for selecting an advertisement for play on a specified media device for one or more users. Each of the one or more users has a defined relationship with the specified media device, and each of the users has a respective information description stored on a mobile communications device of said each user. In one embodiment, the method comprises transmitting the respective information description of each of said one or more users from the mobile communications device of said each user to a provider server, the provider server analyzing the information description of said each of the one or more users to identify an advertisement to play on the specified device, and sending the identified advertisement to the specified device for playing thereon. The information description of each user includes a purchase plan, a purchase profile, and a purchase power of said each user. The specified device, in one embodiment, is a television.

In one embodiment, a plurality of the users have said defined relationship with the specified device, and the transmitting includes transmitting the plurality of the purchase plans of said plurality of users from the mobile communications devices of said plurality of users to the provider server. In this embodiment, the analyzing includes analyzing said plurality of the purchase plans to identify one or more common features of said plurality of the purchase plans. In an embodiment, said one or more common features includes a plurality of common features, and said analyzing further includes ranking said common features based on a given algorithm.

In an embodiment, the transmitting includes transmitting the purchase plan of said each user from the mobile communications device of said each user to the specified media device, and transmitting the purchase plan of said each user from that specified media device to the provider server. In one embodiment, the transmitting the purchase plan of said each user includes transmitting the purchase plan of said each user from the mobile communications device of said each user to the specified device when said each user comes within a given distance of the specified device.

In one embodiment, the transmitting the respective purchase plan further includes the specified device sending a given signal, and said each of the mobile communications devices receiving said given signal, and the mobile communications device of said each user transmitting the purchase plan of said each user to the specified media device in response to receiving the given signal from the specified device.

In an embodiment, for example, at least one of said one or more purchase plans specifies a time for a purchase, and the analyzing includes selecting the advertisement on the basis of said specified time.

In one embodiment, for example, the specified media device is a specified television, and said defined relationship is the one or more user are all within a given distance of the specified television. In an embodiment, for example, the defined relationship is the one or more users are all within a defined area.

In an embodiment of the invention, advertisements are displayed based on common purchase profiles and common purchase plans among different people. For example, if multiple persons are watching a television program together, the advertisements may be displayed based on their common purchase requirements.

In one embodiment, a user creates a purchase plan on his mobile phone software, and once the user watches a television program, his purchase plan is sent to the television through a wireless transmission (from the mobile phone). Similarly, the television will gather other such purchase plans and purchase profiles from different people who are nearby to the television. This information is sent to the television service provider to find common requirements among the people watching the television, and then appropriate television advertisement will be displayed so that everybody nearby the television can enjoy the advertisement.

If no common products are identified, then close match advertisements can be displayed. The rule or algorithm that is used to determine which advertisements to show can be defined in the television service provider's server.

If only one person is watching the television, then the television advertisement can be displayed based on his purchase plan. The user defines the purchase plan in his mobile phone.

BRIEF DESCRIPTION OF THE SEVERAL VIEWS OF THE DRAWINGS

FIG. 2 shows purchase plans of three users.

DETAILED DESCRIPTION

Figure 1:
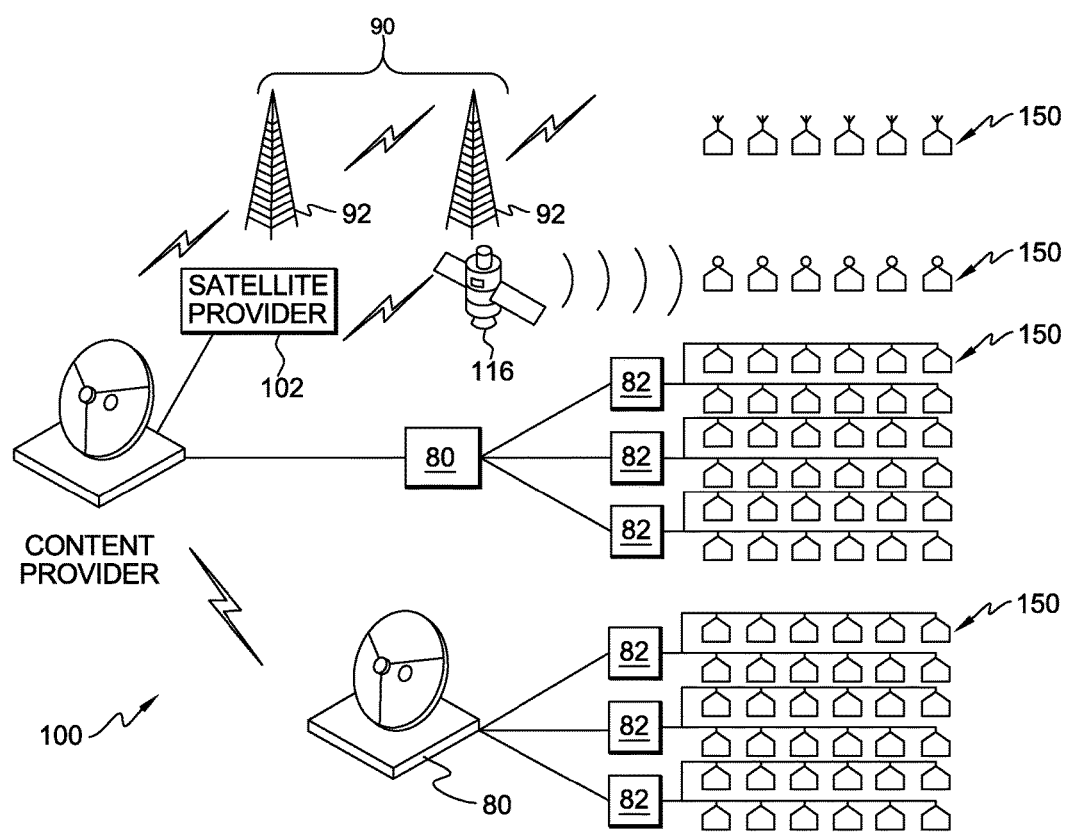
FIG. 1 illustrates a network incorporating an embodiment of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The present invention relates to various structure and functionality for delivery of targeted assets in a communications network. Such targeted assets are typically provided with network content. In this regard, such network or broadcast content may be delivered in a variety of ways including, for example, cable and satellite television networks, satellite radio networks, IP networks used for multicasting content and networks used for podcasts or telephony broadcasts/multicasts. Content may also be broadcast over the airwaves though. Thus, while specific examples are provided below in the context of a cable television network for purposes of illustration, it will be appreciated that the invention is not limited to such contexts but, rather, has application to a variety of networks and transmission modes.

The targeted assets may include any type of asset that is desired to be targeted to network users. It is noted that such targeted assets may include, without limitation, advertisements, internal marketing (e.g., information about network promotions, scheduling or upcoming events), public service announcements, weather or emergency information, or programming. The targeted assets may be independent or included in a content stream with other assets such as untargeted network programming. In the latter case, the targeted assets may be interspersed/interleaved with untargeted programming (e.g., provided during programming breaks) or may otherwise be combined with the programming.

For purposes of illustration, the invention is described below in the context of cable television network implementations. Components of an exemplary cable television network 100 are depicted in FIG. 1 where different modalities are utilized to deliver broadcast content to network users. In the illustrated network 100, broadcast content is distributed to network users via a plurality of network platforms 90. Such network platforms may vary by region, broadcast network and/or nationality. In one arrangement, the network platforms include repeater stations 92 or satellites 116 that receive broadcast content (e.g., directly, over-air and/or via satellite transmissions) and repeat broadcast the content stream to network users/households 150. In another arrangement, the broadcast network provides broadcast content via a series of network platforms.

Such a series of network platforms may include regional/central network platforms as well as local platforms. In a cable television network context, such regional/central network platforms may be represented by regional head ends 80. Each of the regional head ends may be operative to provide broadcast content (e.g., primary distribution) to a plurality of local head ends 82. Such local head ends 82 may then provide content (e.g., secondary distribution) to network users 150. The asset targeting functionality described herein may be implemented at one or more of the network platforms, regional/local head ends, etc.

Generally, the network platforms 90 process received content for transmission to network users. Among other things, the network platforms may be operative to amplify, convert and otherwise process the broadcast content signals as well as to combine the signals into a common cable for transmission to network users 150, e.g., individual households. The network platforms can also process signals from users in a variety of contexts. The network platforms may thus be thought of as the control centers or local control centers of the cable television network 100. It will also be appreciated that local head ends may also be operative to insert local content from local content providers (e.g., local television stations) and/or local asset providers. The broadcast signal is processed by user equipment devices of the network users, which may include a television, data terminal, a digital set top box, digital video recorder (DVR) or other terminal equipment. It will be appreciated that digital or analog signals may be involved in this regard.

The present invention provides the targeted assets based on one or more user purchase plans that are sent wirelessly from one or more users to a nearby electronic media device, such as a television. In one embodiment, a user creates a purchase plan on his mobile phone software, and once the user watches a television program, his purchase plan is sent to the television through a wireless transmission (from the mobile phone). Similarly, the television will gather other such purchase plans and purchase profiles from different people who are nearby to the television. This information is sent to the television service provider to find common requirements among the people watching the television, and then appropriate television advertisement will be displayed so that everybody nearby the television can enjoy the advertisement.

FIG. 2 describes, as examples, the purchase plans of users A, B and C, referenced at 200A, 200B and 200C respectively. Each user defines his purchase plan on his own mobile phone. With the examples of the purchase plans shown in FIG. 2, a user selected the frequency of purchase, the product type, etc, and also defines the possible date of purchase. In one embodiment, a calendar control wizard may be used to help the user define the purchase plan in a variety of ways, such as "one day every month," "the last day of each month," or by a specified date in each month or each year, etc.

In an embodiment, once the users come close to a television, then the mobile phones send (through wireless) the purchase plans to the television. The television gathers all possible purchase plans from different users in a defined space or position relative to the television, and common purchase requirements among these different users are identified. Television advertisements are then displayed on the television accordingly.

In an embodiment of the invention, each user also defines a purchase profile. This is basically a budget that indicates how much money the user wants to spend on various items, such as food items, gift items, etc. This information is also sent to the television, and this information is also an important factor to find the appropriate advertisement.

From the information in the purchase plans shown in FIG. 2, it is clear that the common products among the users A, B and C are product 1, product 2 and product 3. So, the advertisement that will be displayed will be based on those products, and then other common products.

The mobile phone software may, in an embodiment, have a Purchase Plan and Purchase Profile editor. The user can create/modify/delete the purchase plan according to his own requirements.

Figure 3:
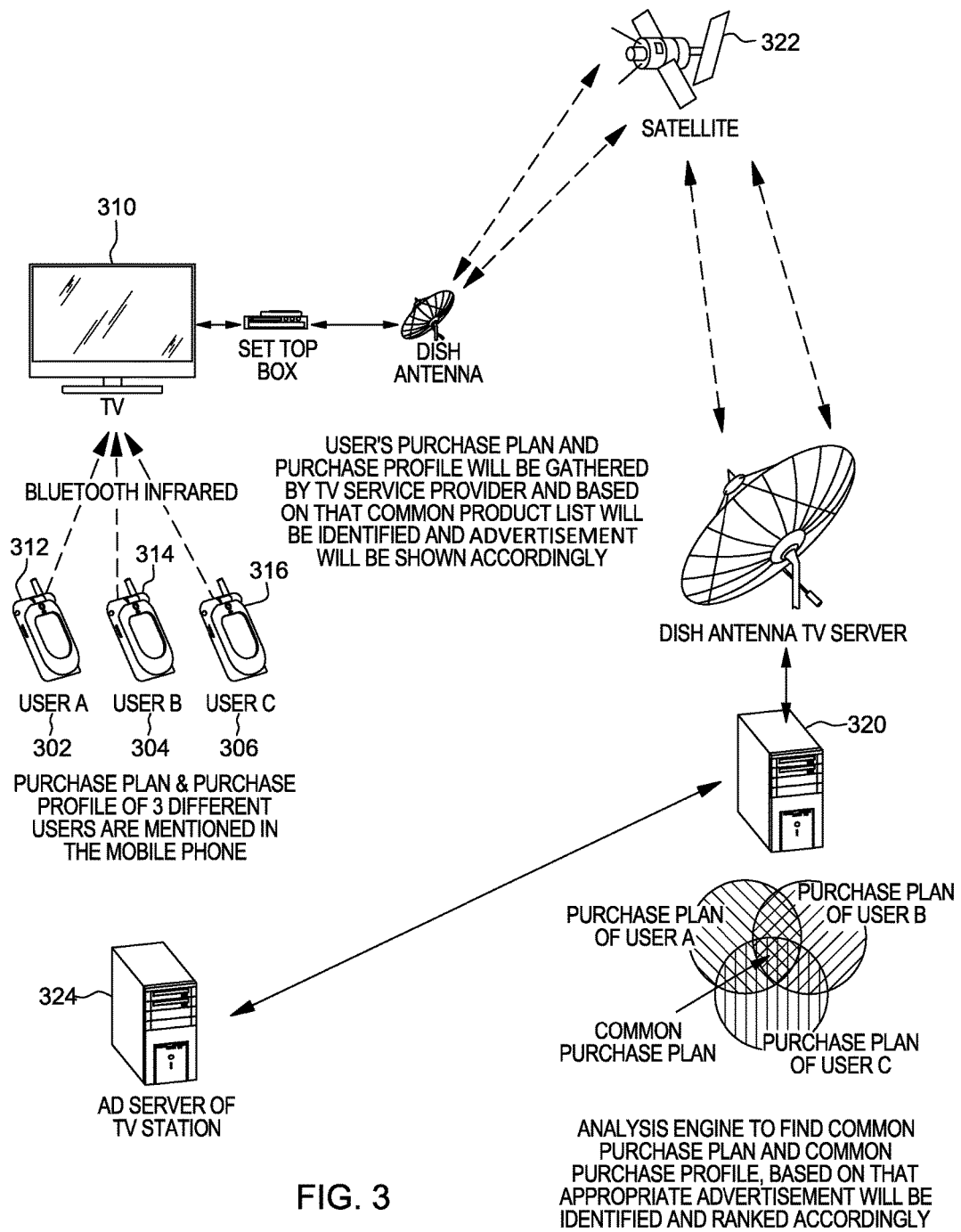
FIG. 3 illustrates an implementation of an embodiment of the invention.
Figure 4:
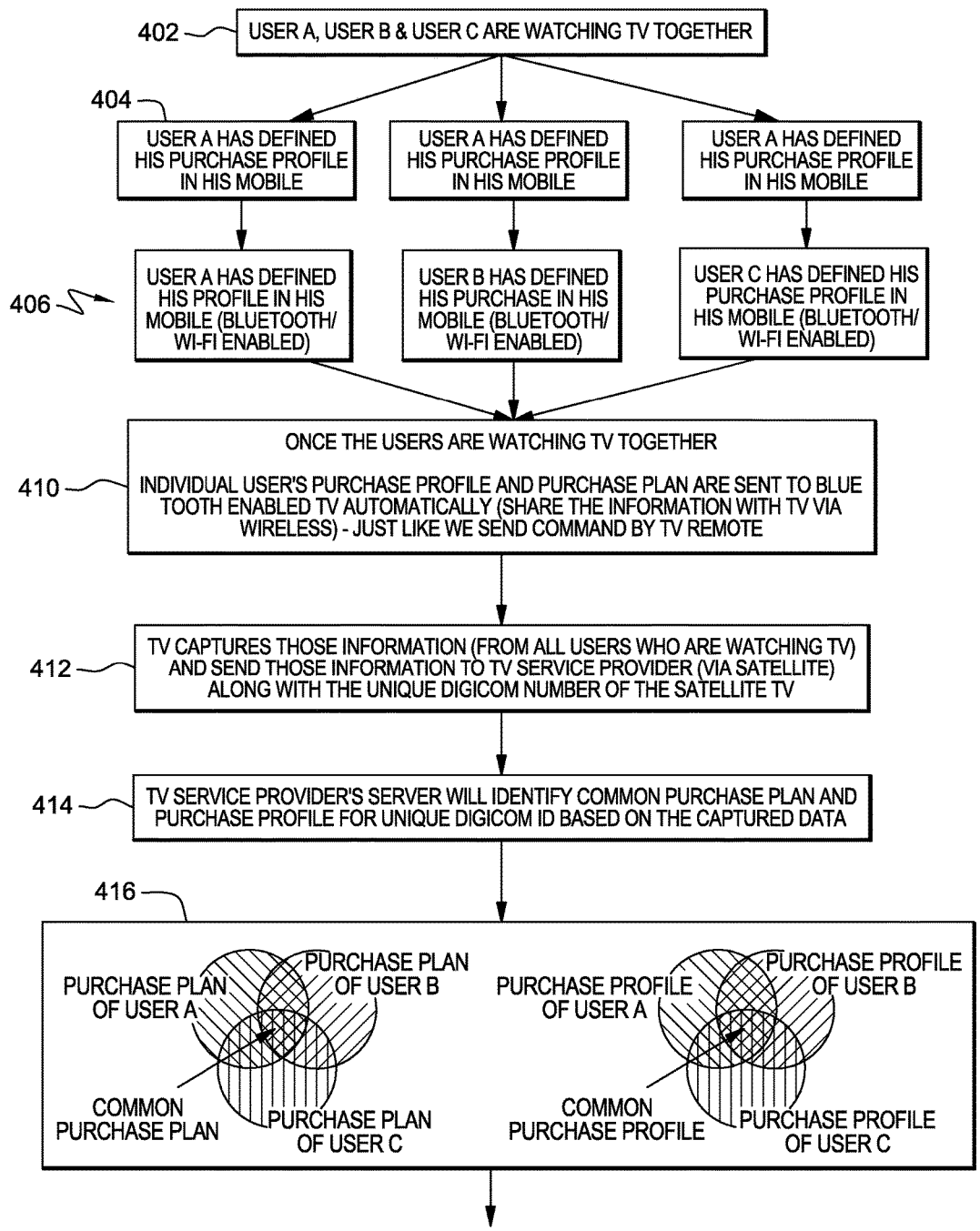
FIGS. 4 and 5 comprise a flow chart showing the procedure used in the implementation of FIG. 3.
Figure 5:
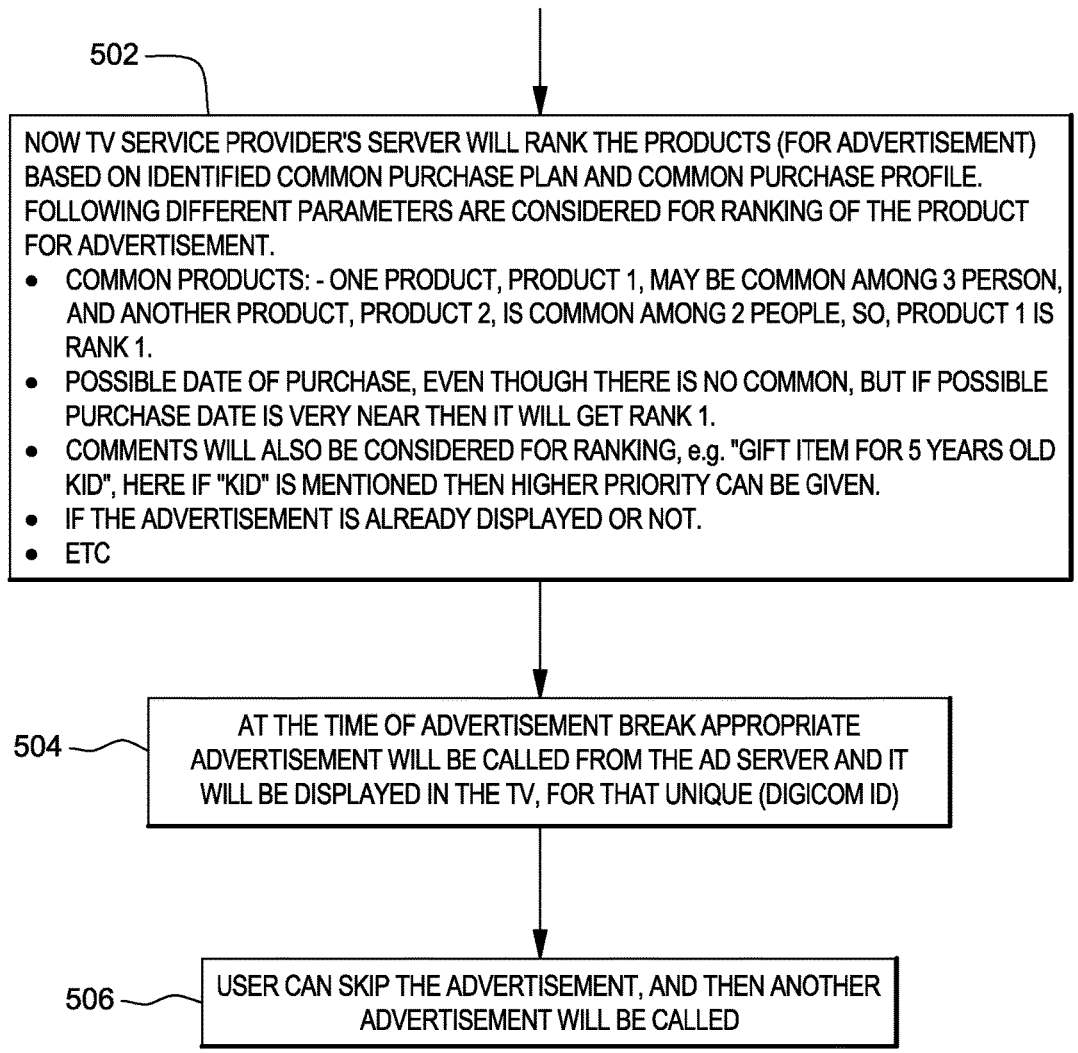

FIGS. 3, 4 and 5 describe one specific example of the invention, in which three different users, 302, 304, 306 come close to a television 310. Then, their purchase plans are shared with that television, and then their common purchase requirements are identified, and advertisements are shown on the television accordingly.

As represented at step 402 of FIG. 4, the process, in this embodiment of the invention, begins when users A, B and C are watching television together. The users have, as represented at 404 and 406, already defined their respective purchase profiles and purchase plans on their mobile telephones 312, 314, 316.

As represented at 410, once the uses are watching a television program together, each individual user's purchase profile and purchase plan are sent automatically to the television 310. This transmission may be done in any suitable way. For example, the purchase profile and purchase plan may be sent via a wireless transmission, just as commands are sent by a wireless, remote control for the television.

The television, at step 42, captures the information from users A, B and C (and from all the users who are watching the television), and sends this information to the television service provider, represented at 320, (for example, via satellite 322) along with a unique identification number of the television 310. This identification number may be the unique digicom number of the television.

The television Service Provider's server 320, at step 414 and as depicted at 416, identifies common aspects or features of the purchase plans and purchase profiles for each unique digicom ID on the captured data. At step 502, the television Service Provider's server 320 ranks products (for advertisement) based on identified common purchase plan and common purchase profile. As examples, the following different parameters may be considered for ranking of the products for advertisement: common products; possible dates of purchases; comments of the users; and whether a particular advertisement has or has not already been displayed. Many other parameters may also be used.

Common products may be taken into account in a number of ways. For instance, with the above-example, one product, Product 1, is common among three persons, and another product, Product 2, is common among two people. So, Product 1 is ranked first. Possible dates of purchases may also be used to determine the appropriate advertisement. For example, even though there might be no common product among the users, if the possible purchase date of one product is very near, then that product might be ranked first.

Comments may also be considered for purposes of ranking products or advertisements. For instance, the purchase plan for one of the users might have the comment "Gift item for five year old child." Here, because "child" is mentioned, a higher priority may be given to the parameter.

As represented at step 504, at the time of an advertisement break in the television programming, the appropriate advertisement is called from the ad server 324 and is shown on the television having the above-mentioned unique digicom ID.

In embodiments of the invention, each television, or an associated device such as an adaptor or set top-box, can have a unique readable identification or serial number in order to enable the television service provider to identify each television and to send each television the corresponding targeted advertisements. The unique number for each television can be encrypted and scrambled, changing its actual numeric form in order to protect the privacy of the corresponding television viewer or viewers.

As will be appreciated by those of ordinary skill in the art, any suitable rule, procedure or algorithm may be used to determine the actual advertisements that are sent to the televisions. Also, when determining the appropriate advertisement, information in addition to the user purchase plan and purchase profile may be considered. For example, the location of the television may be used so that the viewers may be shown targeted, locally oriented advertisement. The algorithm for choosing the advertisement may also take into account the duration of the time interval allocated for each advertisement.

Another factor that may be taken into account, in embodiments of the invention, is referred to as purchase power. In one case, two users may identify the same item but at different prices. For example, User A may want to purchase a diamond ring within a range of $250-$500, but another User B want to purchase a diamond ring within a range of $3,000-$3,500. Here, User B has more purchase power. In this case, both users may have the same type of product (diamond ring) in their purchase plans, but as the prices are different, an advertisement for diamond rings is not shown. Instead, advertisements for other common products or items will be displayed.

As a second case, User A has a monthly income of $1,000 and User B has a monthly income of $10,000. The provider's server logic may also take this information into account when identifying the appropriate advertisement to show to the Users A and B.

Figure 6:
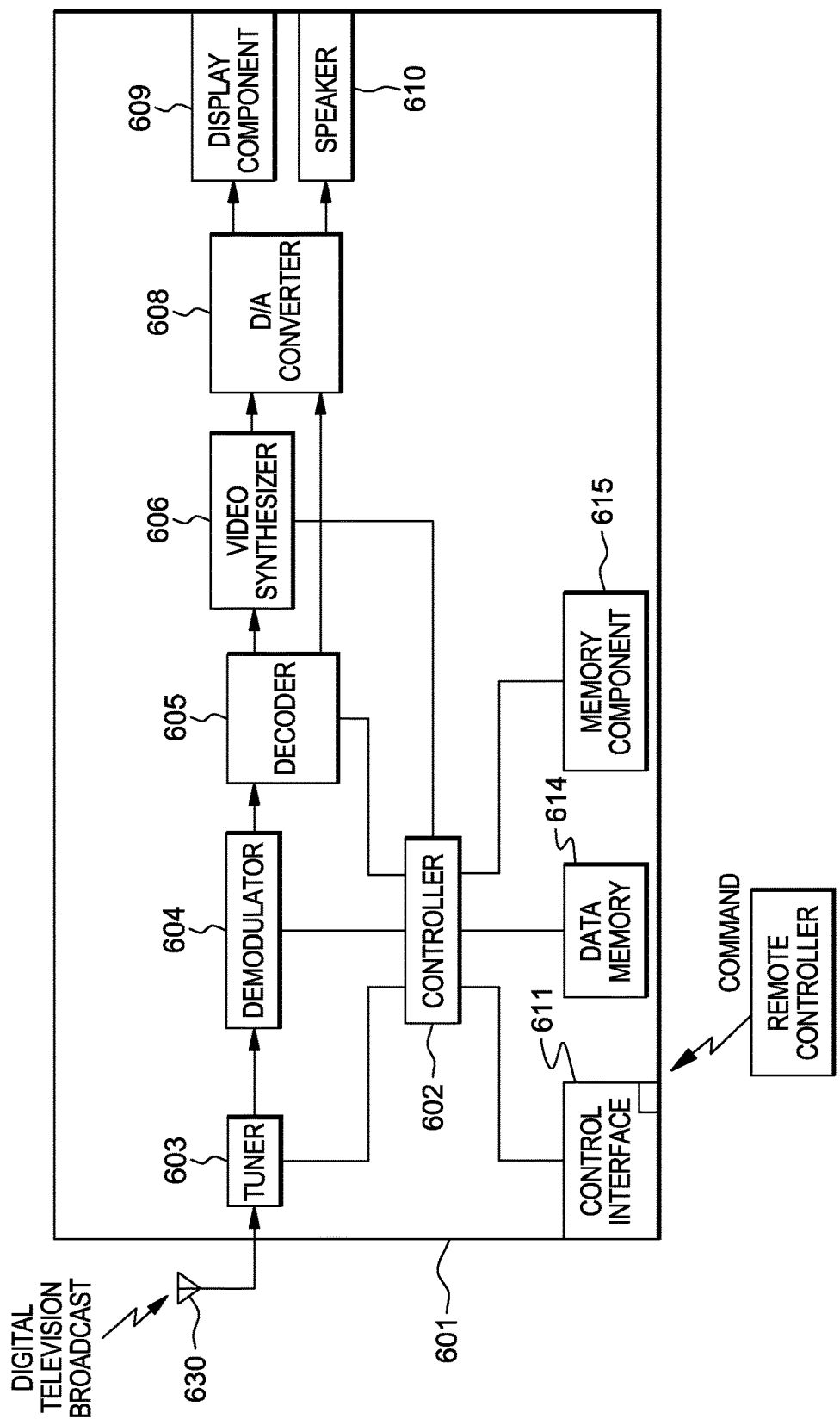
FIG. 6 shows in more detail a television used in the implementation of FIG. 3

FIG. 6 is a block diagram of a digital television 601 ("TV") that may be used in system. The TV 601 includes a controller 602 (e.g., control section or control means), a tuner 603 (e.g., reception section or reception means), a demodulator 604, a decoder 605, a video synthesizer 606, D/A converter 608, a display component 609, a speaker 610, a control interface 611, a data memory 614 (e.g., memory section or memory means), and a memory component 615 (e.g., memory section or memory means).

The controller 602 controls the operation of the various components of the TV 601. The tuner 603 receives television broadcast signals of digital television broadcast for selected channels via an antenna 630, and the demodulator 604 demodulates the received television broadcast signal into digital data. The decoder 605 separates the demodulated digital data into video data and audio data, and expands both types of data, and the video synthesizer 606 synthesizes an image based on the video data and a desired OSD (On Screen Display) image. The D/A converter 608 converts signals for the video data and audio data into analog signals, and the control interface 611 receives user inputs from a remote controller. The data memory 614 stores registered information, such as a channel list associating selected channel numbers with the television broadcast signals, etc, and the memory component 615 stores control programs for the TV 601. The display component 609 displays images on a screen based on the video data. The speaker 610 outputs sound based on the audio data.

The controller 602 includes a microprocessor, for example. The controller 602 has a RAM (not shown) as a work field for expanding data and so forth to be processed by the control programs, and a clock (not shown) for keeping track of the current time in the controller 602. The control interface 611 has a light receiver that receives a signal sent from the remote controller. The control interface and the remote controller have the same keys for operating the TV 601. As examples, the data memory 614 includes an EEPROM, and the memory component 615 includes a ROM.

Figure 7:
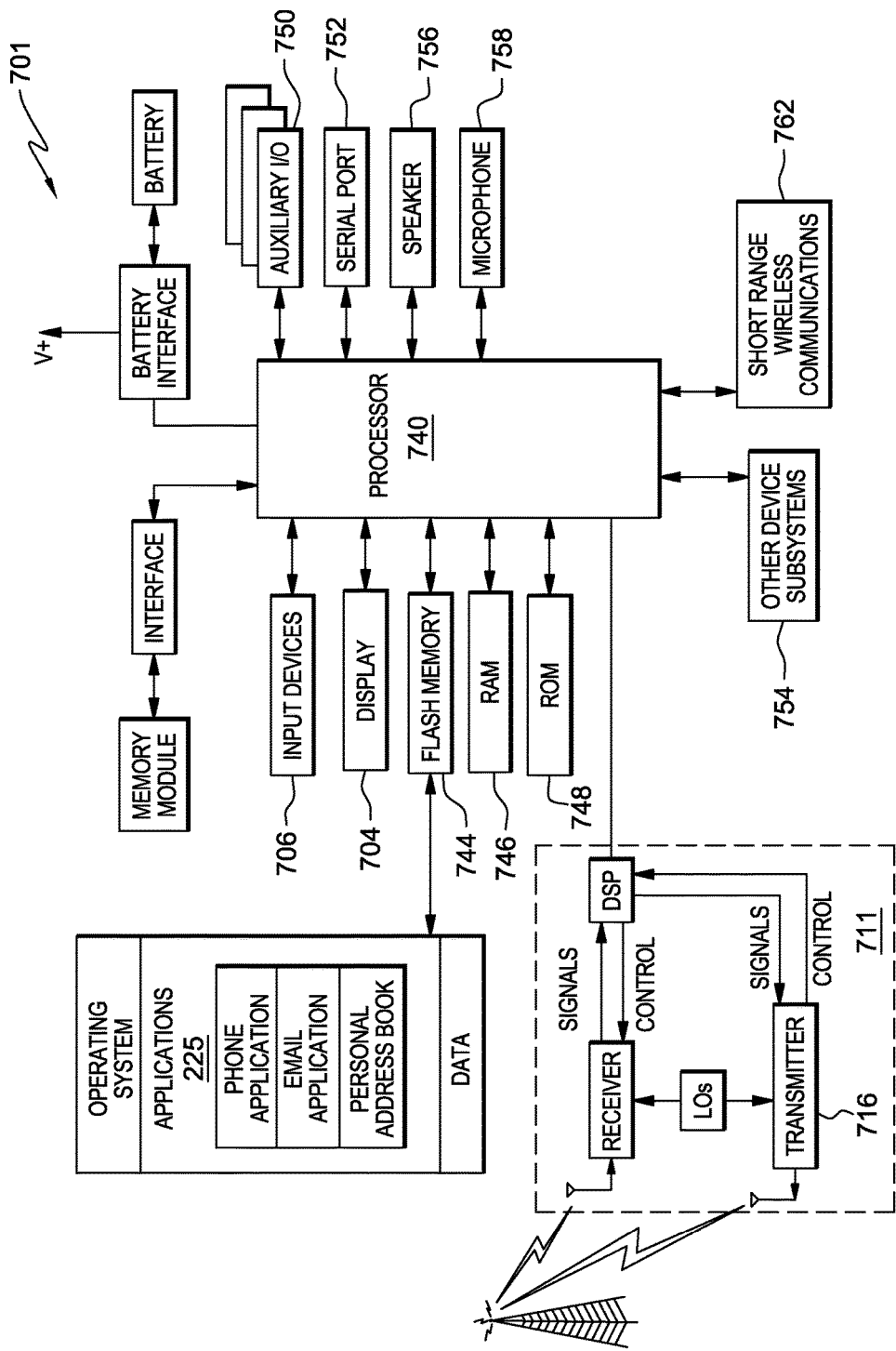
FIG. 7 is a block diagram of a mobile communications device that may be used in the embodiment of FIG. 3.

FIG. 7 illustrates a mobile communications device 701 that may be used in the practice of the present invention. The mobile device is a two-way communication device having data and voice communication capabilities, and the capability to communicate with other computer systems, for example, via the Internet. Depending on the functionality provided by the mobile device 701, in various embodiments, the device 701 may be a multiple-mode communication device configured for both data and voice communication, a smartphone, a mobile telephone or a PDA (personal digital assistant) enabled for wireless communication, or a computer system with a wireless modem.

The mobile device 701 includes a rigid case (not shown) housing the components of the device 701. The internal components of the device 701 are constructed on a printed circuit board (PCB). The mobile device 701 includes a controller comprising at least one processor 740 (such as a microprocessor) which controls the overall operation of the device 701. The processor 740 interacts with device subsystems such as a communication subsystem 711 for exchanging radio frequency signals with a wireless network to perform communication functions. A transmitter 716 is provided to send and receive data wirelessly. A separate infrared transmitter may be provided for infrared transmissions, as are done by a standard remote control for a television.

The processor 740 interacts with additional device subsystems including a display (screen) 704 such as a liquid crystal display (LCD) screen, input devices 706 such as a keyboard and control buttons, flash memory 744, random access memory (RAM) 746, read only memory (ROM) 748, auxiliary input/output (I/O) subsystems 750, data port 752 such as serial data port, such as a Universal Serial Bus (USB) data port, speaker 756, microphone 758, short-range communication subsystem 762, and other device subsystems generally designated as 764. Some of the subsystems shown in FIG. 7 perform communication-related functions, whereas other subsystems may provide "resident" or on-device functions.

The device 701 may comprise a touchscreen display in some embodiments. The touchscreen display may be constructed using a touch-sensitive input surface connected to an electronic controller and which overlays the display screen 704. The touch-sensitive overlay and the electronic controller provide a touch-sensitive input device and the processor 740 interacts with the touch-sensitive overlay via the electronic controller.

Figure 8:
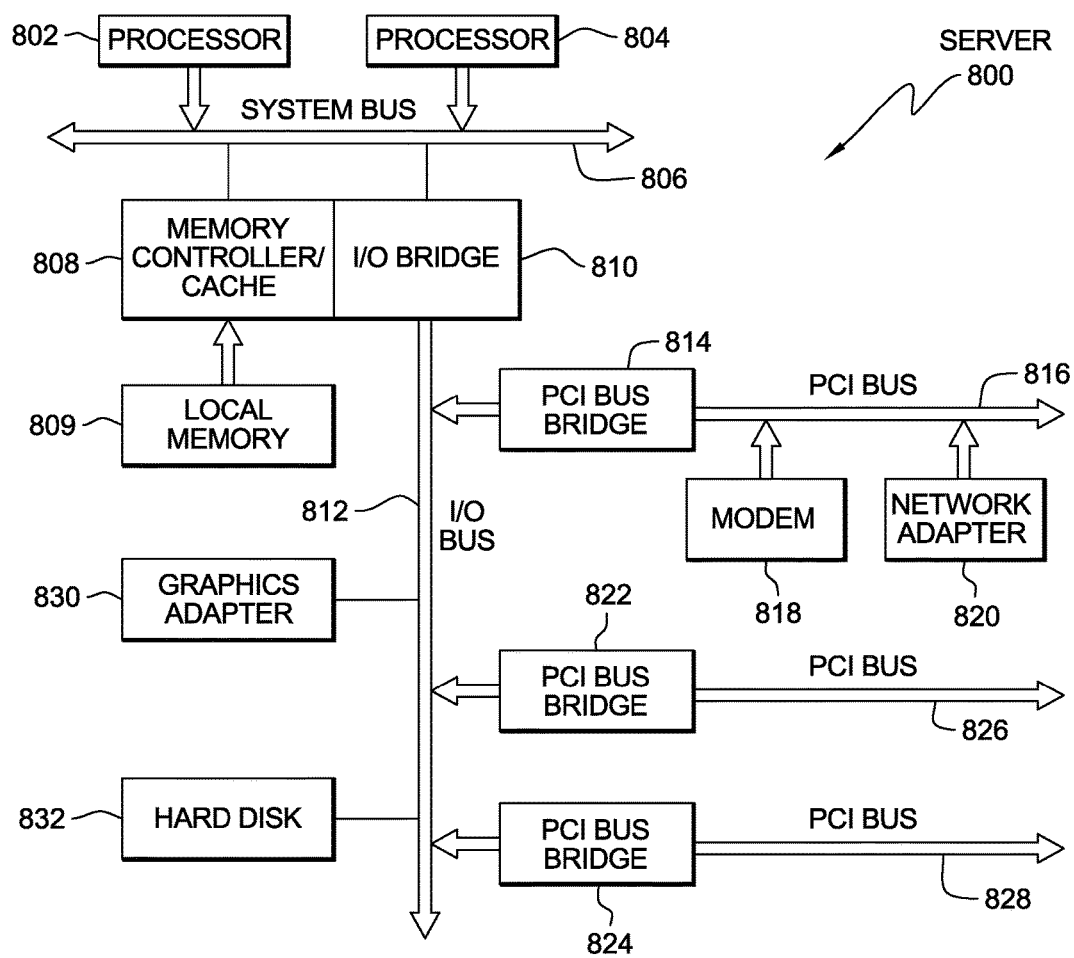
FIG. 8 illustrates a server used in the system of FIG. 3.

FIG. 8 is a block diagram of a data processing system that may be implemented as a server, such as server 320 or server 322 in FIG. 3, in accordance with the present invention. Data processing system 800 may be a symmetric multiprocessor (SMP) system including a plurality of processors 802 and 804 connected to system bus 806. Alternatively, a single processor system may be employed. Also connected to system bus 806 is memory controller/cache 808, which provides an interface to local memory 809. I/O bus bridge 810 is connected to system bus 806 and provides an interface to I/O bus 812. Memory controller/cache 808 and I/O bus bridge 810 may be integrated as depicted.

Peripheral component interconnect (PCI) bus bridge 814 connected to I/O bus 812 provides an interface to PCI local bus 816. A number of modems 818-820 may be connected to PCI bus 816. Typical PCI bus implementations support four PCI expansion slots or add-in connectors. Communications links to network computers may be provided through modem 818 and network adapter 820 connected to PCI local bus 816 through add-in boards. Additional PCI bus bridges 822 and 824 provide interfaces for additional PCI buses 826 and 828, from which additional modems or network adapters may be supported. In this manner, server 800 allows connections to multiple network computers. A memory-mapped graphics adapter 830 and hard disk 832 may also be connected to I/O bus 812 as depicted, either directly or indirectly.

Those of ordinary skill in the art will appreciate that the hardware depicted in FIG. 8 may vary. For example, other peripheral devices, such as optical disk drives and the like, also may be used in addition or in place of the hardware depicted. The depicted example is not meant to imply architectural limitations with respect to the present invention. The data processing system depicted in FIG. 8 may be, for example, an IBM RISC/System 6000, a product of International Business Machines Corporation in Armonk, N.Y., running the Advanced Interactive Executive (AIX) operating system.

While it is apparent that the invention herein disclosed is well calculated to fulfill the objectives discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of selecting an advertisement for play on a specified device to a defined group of users, wherein each user of the group of users has a purchase plan defined by said each user stored on a mobile communications device of said each user, the method comprising:
   transmitting the user defined purchase plan of each user of said group of users from the mobile communications device of said each user to a provider server;
   the provider server analyzing the user defined purchase plans received from the mobile communications devices of said group of users to identify an advertisement to play on the specified device; and
   sending the identified advertisement to the specified device for playing thereon to said group of users; and wherein:
   the purchase plan of each user identifies one or more products and specified purchase information;
   the analyzing the user defined purchase plans includes:
   ranking a plurality of the products identified in the purchase plans received from the group of users based on information in said purchase plans received from the mobile communications devices of said group of users, including using the specified purchase information in the purchase plans received from the mobile communications devices of the group of users to rank the identified products; and
   identifying the advertisement based on said ranking of the products identified in the purchase plans received from the mobile communication devices; and said plurality of products are identified as products in common among the users by being identified in the purchase plans of two or more of the users.

2. The method according to claim 1, wherein the transmitting includes transmitting the purchase plans of said each user from the mobile communications device of said each user to the specified device.

3. The method according to claim 2, wherein the transmitting the purchase plans further includes transmitting the purchase plans of said each user from the specified device to the provider server.

4. The method according to claim 2, wherein the transmitting the purchase plan of said each user includes transmitting the purchase plan of said each user from the mobile communications device of said each user to the specified device when said each user comes within a given distance of the specified device.

5. The method according to claim 2, wherein the transmitting the purchase plans further includes:
the specified device sending a given signal;
said each of the mobile communications devices receiving said given signal; and
the mobile communications device of said each user transmitting the purchase plan of said each user to the specified device in response to receiving the given signal from the specified device.

6. The method according to claim 1, wherein:
at least one of said purchase plans specifies a time for a purchase; and
the analyzing includes selecting the advertisement on the basis of said specified time.

7. The method according to claim 6, wherein:
the information description of each user identifies a purchase power of said each user; and
the analyzing includes selecting the advertisement on the basis of said purchase power.

8. The method according to claim 1, wherein the specified device is a specified television, and the one or more user are all within a given distance of the specified television.

9. The method according to claim 1, wherein the specified device is a specified television, and the one or more users are all within a defined area.

10. The method according to claim 1, wherein:
the specified device is a television, and all of the users of said group of users are watching the television;
the ranking includes ranking the products based on a number of the purchase that identify each of the products; and
the purchase plan of each user specifies a plurality of product purchases by said each user, dates of purchases, a monthly income of the user, and offered prices for the products.

11. The method recording to claim 1, wherein:
the ranking a plurality of the products identified in the purchase plans includes ranking each of the plurality of the products relative to the others of the plurality of the products; and
said ranking is based on specified words in the purchase plans, and a defined purchase power of each user of the group of users.

12. The method according to claim 1, wherein:
the specified device is a television, and all of the users of said group of users are watching the television;
the ranking includes ranking the products, identified as in common among the users, based on a number of the information descriptions that identify each of said products in common among the users; and the information description of each user specifies a plurality of product purchases by said each user, specifies possible dates of future purchases, a monthly income of the user, and prices offered by the users for the products.

13. A system for selecting an advertisement for play to a group of users, comprising:
a specified device for playing electronic media, and wherein each user of the group of users has a defined relationship with the specified device;
one or more mobile communications devices, wherein each user of the group of users has one of the mobile communication devices and a respective purchase plan defined by said each user stored thereon, the user defined purchase plan of each user identifying one or more products and specified purchase information; and
a provider server for receiving the purchase information of each user of said group of users from the mobile communications devices of the users, and for analyzing the user defined purchase plans received from the mobile communications devices of said each of the one or more users to identify an advertisement to play on the specified device; and wherein:
the identified advertisement is sent to and played on the specified device for said group of users;
the analyzing the user defined purchase plans includes:
ranking said products identified from the products identified in the purchase plans of the group of users based on information in said purchase plans received from the mobile communications devices of said group of users, including using the specified purchase information in the purchase plans received from the mobile communications devices of the group of users to rank the identified products; and
identifying the advertisement based on said ranking of the products identified in the purchase plans received from the mobile communication devices; and
said plurality of products are identified as products in common among the users by being identified in the purchase plans of two or more of the users.

14. The system according to claim 13, wherein:
the provider server receives the purchase plans of the group of users from the mobile communications devices of said group of users, analyzes said purchase plans to identify one or more common products of said purchase plans, and selects the advertisement to play on the specified device on the basis of said one or more common products.

15. The system according to claim 13, wherein the specified device receives the purchase plans of said each user from the mobile communications device of said each user and transmits said purchase plans to the provider server.

16. The system according to claim 13, wherein the purchase plan of said each user is transmitted from the mobile communications device of said each user to the specified device when said each user comes within a given distance of the specified device.

17. The system according to claim 13, wherein the specified device is a specified television, and the one or more users are all within a defined area relative to said specified television.

18. An article of manufacture comprising:
at least one tangible computer readable hardware device having computer readable program code logic tangibly embodied therein to execute machine instructions in one or more processing units for selecting an advertisement for play on a specified device to a defined group of users, wherein each user of the group of users has a respective purchase plan defined by said each user stored on a mobile communications device of said each user, the user defined purchase plan of each user identifying one or more products and specified purchase information, said computer readable program code logic, when executing, performing the following:

receiving and storing the respective user defined purchase plan of each user of said group of users, from the mobile communications device of said each user, in a provider server;

at the provider server, analyzing the user defined purchase plans sent from the mobile communications devices of said each of the users to identify an advertisement to play on the specified device; and sending the identified advertisement to the specified device for playing thereon to said group of users; and wherein:

the analyzing the user defined purchase plans includes:

ranking the products identified in the purchase plans of the group of users based on information in said purchase plans received from the mobile communications devices of said group of users, including using the specified purchase information in the purchase plans received from the mobile communications devices of the group of users to rank the identified products; and identifying the advertisement based on said ranking of the products identified in the purchase plans received from the mobile communication devices; and said plurality of products are identified as products in common among the users by being identified in the purchase plans of two or more of the users.

19. The article of manufacture according to claim 18, wherein:

the analyzing includes analyzing said plurality of the information descriptions to identify one or more common features of said plurality of the purchase plans.

20. The article of manufacture according to claim 19, wherein:

the purchase plan of each user specifies a plurality of product purchases by said each user, dates of purchases, a monthly income of the user, and offered prices for the products; and the ranking includes ranking said common products based on identified comments from one of the users, said dates of purchases, the monthly income of the user, and the offered prices for the products.

* * * * *